United States Patent
Hader et al.

[11] Patent Number: 5,813,959
[45] Date of Patent: Sep. 29, 1998

[54] ROLLER

[75] Inventors: Peter Hader, Kempen; Klaus Kubik, Krefeld, both of Germany

[73] Assignee: Eduard Küsters Maschinenfabrik GmbH & Co. KG, Krefeld, Germany

[21] Appl. No.: 619,597

[22] PCT Filed: Sep. 9, 1994

[86] PCT No.: PCT/DE94/01037

§ 371 Date: Sep. 24, 1996

§ 102(e) Date: Sep. 24, 1996

[87] PCT Pub. No.: WO95/09309

PCT Pub. Date: Apr. 6, 1995

[30] Foreign Application Priority Data

Sep. 27, 1993 [DE] Germany .............. 9314568 U

[51] Int. Cl.⁶ .................................................. B23P 15/00
[52] U.S. Cl. ........................... 492/7; 492/16; 492/50; 492/56
[58] Field of Search ................. 492/56, 59, 50, 492/16, 20, 17, 18, 7; 162/358.3; 100/163 R, 162 B

[56] References Cited

U.S. PATENT DOCUMENTS

| | | |
|---|---|---|
| 3,119,324 | 1/1964 | Justus . |
| 3,157,110 | 11/1964 | Goddard . |
| 4,327,467 | 5/1982 | Quaint . |
| 5,393,290 | 2/1995 | Lehmann et al. ................ 492/7 |
| 5,655,444 | 8/1997 | Kayser et al. ................... 492/7 |

FOREIGN PATENT DOCUMENTS

| | | |
|---|---|---|
| 344 204 | 7/1978 | Austria . |
| 0 258 478 | 3/1988 | European Pat. Off. . |
| 2311133 | 12/1976 | France . |
| 2 005 619 | 4/1973 | Germany . |
| 2 139 159 | 1/1974 | Germany . |
| 21 50 991 | 12/1976 | Germany . |
| 25 55 677 | 6/1977 | Germany . |
| 25 22 657 | 6/1978 | Germany . |
| 22 30 139 | 1/1980 | Germany . |
| 30 22 491 | 12/1981 | Germany . |
| 31 01 115 | 7/1982 | Germany . |
| 31 26 492 | 10/1983 | Germany . |
| 33 10 450 | 8/1984 | Germany . |
| 33 05 429 | 4/1986 | Germany . |
| 30 10 741 | 10/1986 | Germany . |
| 33 00 251 | 3/1988 | Germany . |
| 33 31 566 | 7/1988 | Germany . |
| 88 08 352 U | 9/1988 | Germany . |
| 36 40 903 | 5/1989 | Germany . |
| 38 13 598 | 11/1989 | Germany . |
| 39 36 128 | 11/1991 | Germany . |
| 41 06 062 | 6/1992 | Germany . |
| 92 11 162 U | 3/1994 | Germany . |
| 615 486 | 1/1980 | Switzerland . |
| 680424 | 8/1992 | Switzerland . |
| 682894 | 12/1993 | Switzerland . |
| 1135901 | 12/1968 | United Kingdom . |
| 2057092 | 3/1981 | United Kingdom . |
| 2105497 | 3/1983 | United Kingdom . |
| WO 92/13787 | 8/1992 | WIPO . |
| WO 92/19809 | 11/1992 | WIPO . |

OTHER PUBLICATIONS

"Leichtlaufrollen aus Faserverbundwerkstoffen" (Rollers Made of Composite Fiber Materials)—Freudenberg.

*Primary Examiner*—Irene Cuda
*Attorney, Agent, or Firm*—Kenyon & Kenyon

[57] ABSTRACT

The roller is provided for pressure treatment of a strip of paper, textile, plastic film, sheet metal or similar material. It includes a hollow roller made of a fiber-reinforced synthetic resin material, and a cross-beam which passes through the hollow roller lengthwise. The cross-beam is mounted at its ends, in external supports, so as not to rotate. Hydrostatic support elements are arranged on the cross-beam on the side on which pressure is exerted. The elements can be pressed against the inside circumference of the hollow roller by means of a hydraulic fluid. The support elements have a length not exceeding 20 cm in the longitudinal direction of the hollow roller, follow each other closely in the longitudinal direction of the cross-beam, and can all be controlled independently of one another.

10 Claims, 2 Drawing Sheets

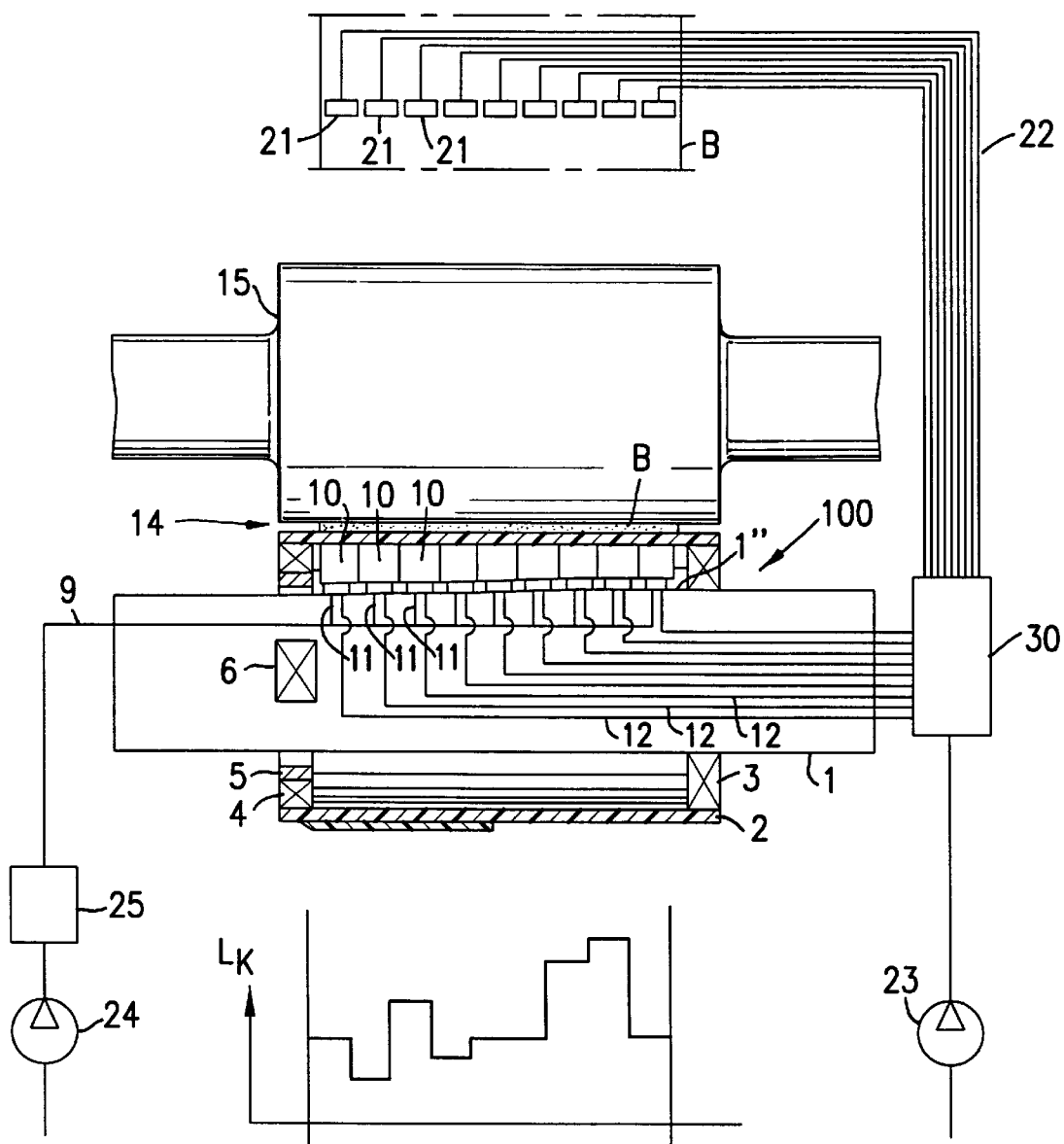
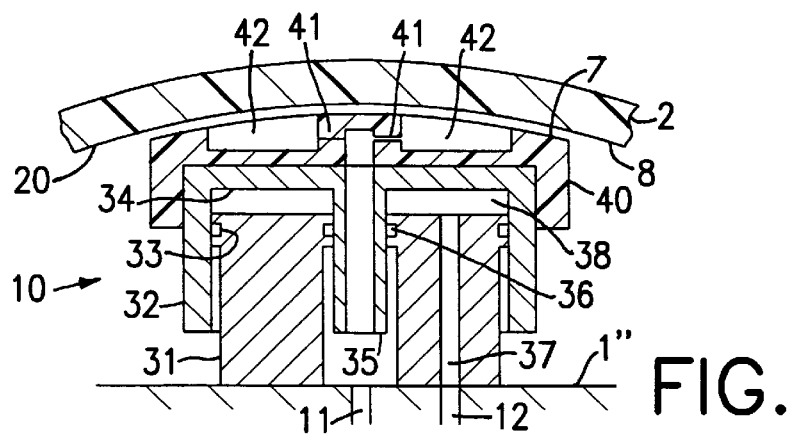
FIG. 4
FIG. 5

ROLLER

FIELD OF THE INVENTION

The present invention relates to a roller for applying pressure to a strip of paper, textile, plastic film, sheet metal, or other similar material.

BACKGROUND OF THE INVENTION

Such a roller is known from WO 92/13787, for a special application case. The known roller is a deflection-controlled pressure roller for a film winder, which has a hollow roller made of a fiber-reinforced plastic with an oil-resistant and/or water-proof protective layer on the inside circumference and a coating of elastomer material on the outside circumference. No details of the design are described.

OBJECTS AND SUMMARY OF THE INVENTION

The present invention is based on the task of developing a roller according to this type further, in such a way that it allows the greatest possible adaptation of the line pressure profile for pressure treatment of material in continuous strips.

This task is accomplished by a roller comprising a rotatable hollow roller having an inside circumference and an outside working roller circumference. The hollow roller comprises fiber-reinforced synthetic resin material, and extends along a longitudinal direction. The roller also includes a cross-beam extending through the hollow roller in the longitudinal direction such that there is radial spacing between the cross-beam and the inside circumference of the hollow roller around the cross-beam. The cross-beam includes ends non-rotatably mounted in external supports. The roller also includes a plurality of hydrostatic support elements arranged in one or more longitudinal rows on the cross-beam. The elements are arranged on a side of the cross-beam on which pressure is exerted by the roller on the strip. The elements are pressable against the inside circumference of the hollow roller by means of hydraulic fluid. The elements each have a contact surface pressable against the inside circumference of the hollow roller. The contact surface includes open bearing pockets defined by edges, which pockets are fillable with hydraulic fluid for supporting the hollow roller. The pockets are adapted to enable the hydraulic fluid to flow over the edges of the pockets to form a liquid film supporting the hollow roller. The support elements have a length not exceeding 20 cm in the longitudinal direction of the hollow roller. The elements are closely arranged with respect to each other in the longitudinal direction, and are controllable independently of one another. Forming the hollow roller out of fiber-reinforced plastic makes it possible to make the hollow roller particularly easy to bend in a plane which passes through its axis, so that the forces applied on the inside by the support elements "strike through" on the outside circumference of the roller, in a line force profile which approximates the force profile as much as possible. Usually, the hollow rollers of deflection-controlled rollers consist of a steel pipe with a wall thickness of 30–100 mm. This steel pipe has a significant inherent stiffness, which extensively equalizes any force profile applied on the inside. Regardless of the desired flexibility of the hollow roller in the plane which passes through its longitudinal axis, its shape stability in the circumference direction should still be such that perfect travel of the hollow roller, without any significant deviation from the circular cross-sectional shape, is still guaranteed. This means that a flexible hose would not be a possibility for use as a hollow roller. Instead, the shape rigidity should be such that the material maintains its pipe shape in the force-free state, and does not already flatten to any noteworthy extent under its own weight, for example.

The reduced bending rigidity in the plane which passes through the axis requires practically continuous support along the roller nip, otherwise a wave-shaped line force distribution will occur in the roller nip, resulting in a drop in line force between the support zones, because of corresponding deflection of the hollow roller. For this reason, the reduction in bending rigidity of the hollow roller is accompanied by "tight packing" of the support elements in the longitudinal direction in the plane which passes through the longitudinal axis, which is actually evident from DE-OS 30 22 491.

In the usual deflection-controlled rollers with hollow rollers made of steel with a relatively great wall thickness, their high bending rigidity, as already mentioned, has the result that it does not make any sense to individually control all the many support elements (up to fifty such support elements are arranged next to one another in the longitudinal direction for larger rollers). It is sufficient (and only this is normally done) if the support elements are controlled in groups, for example in three groups or five groups. For deflection-controlled rollers with hollow rollers made of steel, the fact that there are many individual support elements, in the first place, is connected not so much with a detailed formation of the bending line, but rather with optimum adaptation of the contact of the support elements with the deflected hollow roller: Only for this reason are individual support elements, separate from one another, present within a group that is controlled jointly.

However, the invention is particularly concerned with an especially detailed formation of the line force distribution, and in view of this aspect, it comprises the additional characteristics that the support elements are limited in their longitudinal expanse and can all be controlled independently of one another. In a hollow roller made of fiber-reinforced plastic, a different action on an individual support element certainly does strike through to the outside, and accordingly, individual control is logical and practical.

Individual control of support punches has been known, in principle, as long as there have been punch-supported deflection-controlled rollers. However, these rollers were implemented with hollow rollers made of steel, and in that connection individual control is not logical and practical and therefore was not implemented. Examples for the fact that individual control was known, in principle, are evident from U.S. Pat. No. 3,119,324, DE-OS 22 30 139 and DE-PS 36 40 903.

A roller in accordance with the invention is reliable in operation, with significantly greater variability in the design of the line force profile.

In the preferred exemplary embodiment of the invention, the modulus of elasticity is different in the longitudinal direction and the circumference direction of the hollow roller. The fiber reinforced material of the hollow roller may comprise wound filaments or aggregates of filaments and is made in three layers, wherein fibers of radially outer layers have a winding angle of ±15° relative to the circumferential direction, and fibers of a middle layer have a winding angle of ±15° relative to the longitudinal direction.

A roller with a hollow roller made of rubber-elastic material with reinforcement inserts is evident from DE-PS 25 22 657. However, here the inserts are not arranged in three layers in the manner according to the invention, which has the purpose here of avoiding any sandwich effect which would stiffen the roller with regard to bending in a plane which passes through the axis.

The influence of the winding direction on the modulus of elasticity in roller pipes made of synthetic resin with wound fiber reinforcements is evident, as such, from the company brochure "Walzen in Leichtbauweise . . . ein Produkt von Freudenberg" [Light-weight rollers . . . a Freudenberg product] n of the company Carl Freudenberg in DE 6940 Weinheim.

The hollow roller may have a radial wall thickness of less than 20 mm, and the modulus of elasticity of the material of the hollow roller is less than 100,000N/mm$^2$ in its longitudinal direction.

Fiber-reinforced plastics frequently do not offer optimum slip conditions on the outside surface. For this reason, it is recommended to provide a slip-promoting layer on the inside circumference of the hollow roller, which simultaneously prevents the hydraulic fluid from making direct contact with the resin material of the hollow roller and thereby possibly entering into chemical reactions in the long term.

A coating of an elastomer material can be provided on the outside of the hollow roller, in known manner.

Rollers of the type according to the invention have outside diameters in the range of approximately 40 to 60 cm. The cross-beam which checks the deflection is housed inside these rollers; its cross-section should take up as much as possible of the inside cross-section of the hollow roller, in order to maintain the greatest possible bending rigidity, and should be weakened as little as possible, in any case. If twenty to fifty support elements are present for a larger roller, and these are all supposed to be individually controlled, according to the invention, and therefore to have their own feed lines, space for twenty to fifty pipelines must be created in the available cross-section. This can result in significant space problems.

Also, each support element comprises a hydraulic piston/cylinder unit with a radial axis, wherein each piston/cylinder unit causes a respective contact surface to be pressed against the inside circumference of the hollow roller under the pressure of a cylinder chamber. The cylinder chambers are closed except for their connection to a feed line. The cylinder chambers are connected to separate feed lines with pressures that can be selected independently of one another. The bearing pockets of the individual support elements are connected to a common feed line with the same pressure for all the support elements. The invention therefore also extends to an adapted formation of the individual support elements and their pressure supply.

The comparable state of the art is found in DE-PS 38 13 598. However, in this reference, the hydraulic fluid which is supplied to the individual support elements is regulated by amount, i.e. the same amount of hydraulic fluid flows over the edges of the bearing pockets in all pressure situations. This has its reason, in DE-PS 38 13 598, in the fact that the roller is heated via the hydraulic fluid, which reason stands in the foreground there. In other words, a constant amount of heated bearing pocket fluid is passed to each support element, independent of the force exerted by it, so that heating at the point in question can be maintained independent of the pressure exerted. However, this means that for each pressure element, two separate lines must be available. But since the support elements were only controlled in groups in the known embodiment, with a hollow roller made of steel, it was still possible to implement this number of lines.

In the invention, however, it is actually a matter of individual control, and this can be implemented in relatively easy manner as indicated above. In contrast to the known state of the art, the bearing pocket fluid which is passed to the individual support elements is pressure-controlled. Heating, which was the reason for the amount regulation, does not play such a great role in the application cases according to the invention. All the bearing pockets are connected to a single feed line. The force exerted by each individual support element is determined by the hydrostatic pressure in the cylinder chambers of the individual support elements, which are closed except for the feed line. To change this pressure, only very slight volumes are required, which can be brought in by means of feed lines with a very small cross-section. In total, therefore, only one feed line for larger amounts, namely for the bearing pocket fluid, and a plurality of feed lines with a small cross-section for the cylinder chambers are required, for which space can be made available without significantly weakening the cross-section of the cross-beam.

It is recommended that the individually controlled support elements obtain their pressures automatically on the basis of a property profile determined in the crosswise direction of the strip, for example a moisture profile, a density profile, a thickness profile or something similar, as it is evident as such from DE-OS 25 55 677.

The greater elasticity of the hollow roller in a plane which passes through its axis can have the result that the support elements incur the risk of breaking through the supporting fluid film and directly touching the inside circumference of the hollow roller at their edges which run in the circumference direction and are located in the longitudinal direction, if the hollow roller and/or the cross-beam is deflected to such an extent, in spite of their limited expanse in the longitudinal direction.

In order to avoid this, it is practical to at least partially form the support element of a resilient material, such as an elastomer plastic, for example. Each support element may comprise an elastically resilient material with a modulus of elasticity less than 100,000N/mm$^2$, at least in a region of the element contacting the inside circumference of the hollow roller. Each support element has a cap made of the elastically resilient material, wherein the hydrostatic bearing pockets are formed in the cap.

BRIEF DESCRIPTION OF THE DRAWINGS

The drawings provide a schematic representation of an exemplary embodiment of the invention.

FIG. 4 is a view of a roller device with a roller according to the invention;

FIG. 5 is a partial cross-section view taken in a plane perpendicular to the axis of the hollow roller, through an adapted support element.

DETAILED DESCRIPTION

Figure 1:
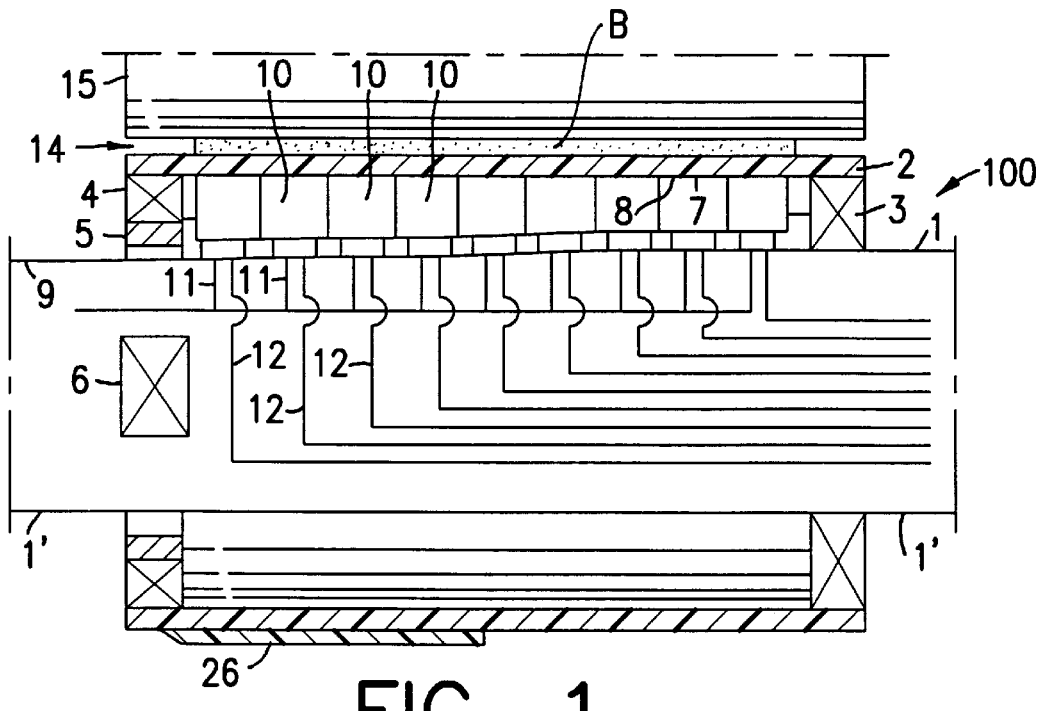
FIG. 1 is a longitudinal cross-section view of a roller according to the invention, the cross-section taken through the roller axis.

The roller, designated in FIG. 1 as a whole as 100, comprises a non-rotating cross-beam 1, which passes through a rotating hollow roller 2 lengthwise, at a distance all around. The ends 1' of the cross-beam 1 which project out of the hollow roller 2 are mounted in a roller stand or in the links of a calender, or in similar manner, not shown.

In the embodiment shown in FIG. 1, at the right end of the hollow roller 2, the hollow roller 2 is mounted on the cross-beam 1 via a roller bearing 3. At the left end of the hollow roller 2, a different embodiment is shown, in which the hollow roller 2 is mounted on a ring 5 via a bearing 4, which ring can move up and down slightly relative to the cross-beam 1, but cannot rotate. On the cross-beam 1, a straight-line guide in the form of two flattened areas 6 of the cross-beam 1, which lie opposite each other, is provided, where the guide ring 5 can slide parallel to the plane of the drawing, with corresponding guide surfaces, not shown. The bearing 3 is able to transfer forces in the direction of effect of the roller 100 from the hollow roller 2 to the cross-beam 1, the bearing only has guidance tasks perpendicular to the plane of effect, which is to be viewed as being the connecting plane of the axis of the hollow roller 2 and the counter-roller 15. In the plane of effect, because of the movability of the guide ring 5, no forces can be passed on from the hollow roller 2 to the cross-beam 1. It is understood that in a practical roller, the formation at both ends of the hollow roller 2 will be the same. The representation in FIG. 1 only serves to explain the roller types which are possible for the invention.

In the embodiment of FIG. 1, nine support elements 10 are arranged over the length of the hollow roller 2, at uniform intervals; they are supported on the cross-beam 1 and rest against the inside circumference 8 of the hollow roller 2 with their support surfaces 7. The support elements 10 are supplied with two separate hydraulic fluids, via a common feed line 9 and branch lines 11 which lead to the individual support elements 10, and additionally via separate feed lines assigned to each individual support element 10; these press the support elements 10 against the inside circumference 8 of the hollow roller, on the one hand, and take over bearing of the support elements 10 at this inside circumference, on the other hand, as will be explained in detail in connection with FIG. 5.

In the exemplary embodiment shown in FIG. 1, the roller nip 14 is located at the top, i.e. a counter-roller 15 lies against the working outside circumference of the roller 2 from the top, above the strip B. This results in a line load for the hollow roller 2, which is supported by the support elements 10 and passed on to the cross-beam 1, which deflects down under this line load, in accordance with FIG. 1, something that is possible because of the distance left all around (shown with significant exaggeration in FIG. 1), making it possible to keep the hollow roller 2 free of stress-related shape changes.

Figure 2:
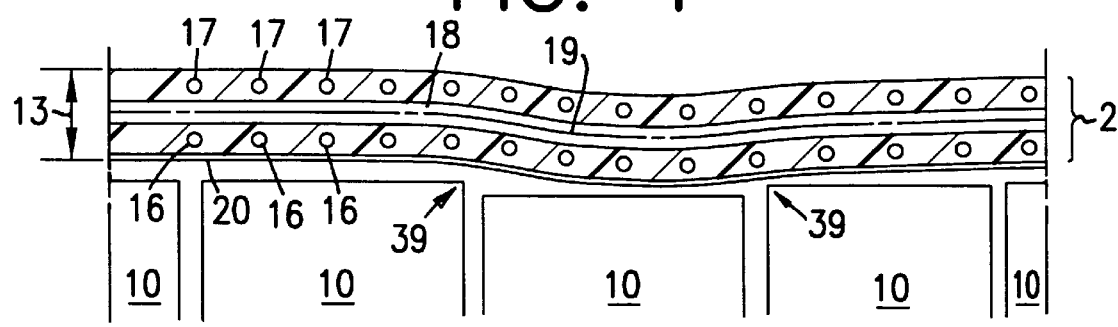
FIG. 2 is a corresponding partial cross-section view through the region in the vicinity of the roller nip, shown on a larger scale.

As is indicated in FIG. 2, the hollow roller 2 consists of a fiber-reinforced synthetic resin, where the radial wall thickness 13 does not exceed 20 mm. In the radially inside and outside regions, there are layers in which the filaments 16 or 17 are wound essentially in the circumference direction, with a deviation of ±15°, as is evident from FIG. 3, where the deviation from the circumference direction amounts to approximately 6°, and is directed differently in the inner and outer layer, so that the fibers 16, 17 cross. In the middle layer, in the region of a neutral fiber or zone 19 which exists in a plane which goes through the axis of the hollow roller 2 when it is bent, the fibers 18 run in the longitudinal direction. Here again, a deviation of ±15° from the longitudinal direction is possible. The purpose of this arrangement is that when the hollow roller 2 is bent, no sandwich effect occurs in a plane which passes through the longitudinal axis, i.e. the fiber orientation which is particularly resistant to longitudinal tensile and pressure stress is kept away from the radially outer layers. This causes the modulus of elasticity of the laminate material of the hollow roller 2 according to FIG. 2 and 3 to be less in the longitudinal direction than in the circumference direction in the radially outer regions. This should also hold true for the wall of the hollow roller 2 as a whole, i.e. fewer strands of the reinforcement fibers should run in the longitudinal direction than in the circumference direction. With this fiber arrangement, it is particularly easy to achieve an influence on the line force by denting the hollow roller 2. In this connection, it is not necessary to bend the entire pipe which forms the hollow roller 2. In this connection, the modulus of elasticity should not exceed 100,000N/mm$^2$.

This makes the hollow roller 2 particularly flexible and it can follow the force profile applied from the inside, by varying the activation of the support elements 10, quite accurately, as is shown in exaggerated manner by the center support element 10 in FIG. 2, which is in a lower position, and the corresponding progression of the hollow roller 2.

A fiber-reinforced plastic material is sometimes not well suited for direct interaction with slip elements such as the support elements 10. For this reason, the inside circumference 8 of the hollow roller 2 is provided with a layer 20 made of a material which promotes slip in interaction with the support elements 10 and which is not permeable for the hydraulic fluid inside the hollow roller 2.

On the outside circumference of the hollow roller 2, a coating 26 of elastomer material can be provided, as indicated in FIG. 1.

FIG. 4 shows an example of use of the roller 100. The roller pair 100, 15 is shown, with the strip B being pressure-treated in its roller nip 14. Above the counter-roller 15, another part of the strip B is shown, which follows the roller nip 14 in the direction of movement of the strip B; at this part, a property profile such as moisture distribution, density distribution, thickness distribution is measured crosswise to the strip, by means of measurement devices 21, of which a number equal to the number of support elements 10 is present in their spots, in the embodiment. The measurement values of the individual measurement devices 21 are passed to a control device 30 via lines 22. Instead of the nine measurement devices 21, it would also be possible to use a single measurement device arranged in traversing manner.

The control device 30 is supplied with hydraulic fluid by a pump 23, and assigns a pressure to the individual support elements 10, separately, via the lines 12, which pressure is formed from the measurement values of the measurement devices 21 by an algorithm stored in memory in the control device 30. A second pump 24 sends hydraulic fluid, via a pressure regulator 25, to the line 9, which supplies all the support elements 10 with a second pressure, the same for all the support elements, via the branch lines 11.

Below the roller 100, a line force distribution $L_K$, for example, is indicated over the width of the material strip $W_B$, as it results from the values measured by the measurement devices 21 according to the calculations of the control device 30. In other words, $L_K$ are the forces which the individual support elements exert. While the hollow roller 2 is still a rigid pipe, in comparison with a steel pipe with the wall thickness usual for deflection-controlled rollers, it is quite flexible for bending stress in a plane which passes through the axis, so that the line force profile indicated in the bottom part of FIG. 4 "strikes through" on the basis of the mechanism indicated in FIG. 2, i.e. can be implemented on he strip B with extensive accuracy.

FIG. 5 shows an individual support element 10, which rests against the inside circumference 8 of the hollow roller 2 with its support surface 7. The support element 10 comprises a piston/cylinder unit with a ring piston 31, which is affixed on the flattened top side 1" of the cross-beam 11, which faces the roller nip 14. The pot-shaped "cylinder" 32 is placed over the ring piston 31; it can be raised and lowered relative to the ring piston 31 and is sealed relative to the ring piston 31 on its inside circumference by means of seals 33. The bottom 34 of the "cylinder" 32 has a pipe-shaped central projection 35, facing towards the open side, which engages into the ring opening of the ring piston 31 and is sealed there by means of seals 36. The ring piston 31 possesses an axis-parallel bore 37, which opens out into the feed line leading to the support element 10 in question. The branch line 11 leads to the inside of the ring piston 31.

The outside of the bottom 34 facing the inside circumference 8 of the hollow roller 2 is covered by a cap-shaped plastic part 40, which consists of a rigid but still slightly resilient material, forming a slip pairing with the coating 20. On the side facing the inside circumference 8 of the hollow roller 2, the cap 40 is shaped as a partial cylinder, so that it rests precisely against the inside circumference 8. The cap 40 forms the support surface 7 there, with one or more flat bearing pockets 42, edged all around, recessed in it, which can be provided with hydraulic fluid from the interior of the pipe-shaped projection 35, via throttle bores 41. The hydraulic fluid which enters into the interior of the pipe-shaped projection 35 from the branch line 11 therefore gets into the bearing pockets 42 via the throttle bores 41, and exerts hydrostatic pressure against the inside circumference 8 of the hollow roller 2 there. The hydraulic fluid constantly flows off over the edges of the bearing pockets 42, and forms a liquid film capable of support on these edges, in the support surface 7, via which film the force of the support element 10 is transferred to the inside circumference 8 of the hollow roller 2.

The pressure in the branch lines 11 is regulated via the pressure regulator 25, specifically to a value that is the same for all the support elements 10. Supply to the bearing pockets 42 of all the support elements 10 is provided via the single line 9, which is a common line for all the support elements.

The force of the support element 10 is determined by the pressure of the cylinder chamber 38 formed between the bottom 34 of the "cylinder" 32 and the top of the "piston" 31. The hydraulic fluid necessary for this is passed to each support element 10 separately, via its own feed line 12. Since the "cylinder" 32 only moves slightly in a radial direction, in normal operation, the amounts of fluid necessary for pressure activation of the cylinder chamber 38 are also very small. The feed lines 12 can therefore have a very small diameter, so that the portion of the cross-section inside the hollow roller 2 required for them, whether inside the cross-beam 1 or on its outside, can still be made available even for larger numbers of support elements 10, without significantly weakening the cross-beam 1.

Making the cap 40 of plastic is supposed to result in a certain resilience of the support surface 7, in order not to allow the formation of overly high surface pressures at the points indicated with 39 in FIG. 2, when there are great pressure differences for consecutive support elements in the axis direction, as they can occur according to the diagram in the bottom part of FIG. 4.

In the top view according to FIG. 5, the support elements 10 have a rectangular cross-section and follow each other directly, or at only a slight distance, in the longitudinal direction of the hollow roller 2. The distances must be dimensioned in such a way that adjacent support elements 10 do not touch each other in case of deflection of the cross-beam 1 or the hollow roller 2, and do not hamper each other's stroke movement. The axial expanse of each individual support element 10 should not exceed 20 cm, in order to achieve the most precise possible gradation of support of the hollow roller 2.

Figure 3:
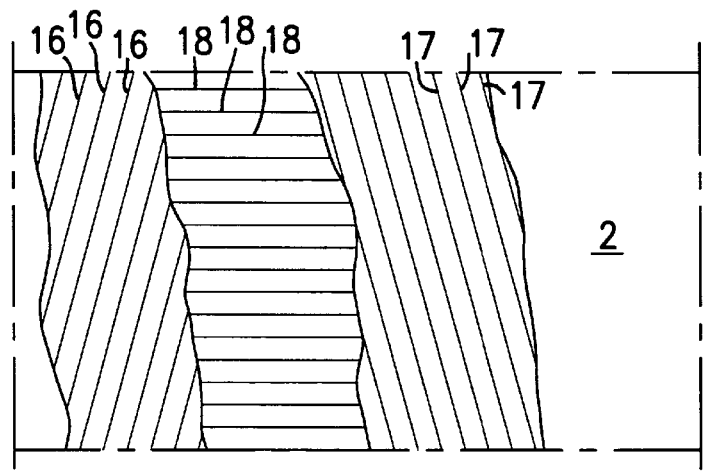
FIG. 3 is a radial partial cross-section view shown at different radial distances, in order to show the orientation of the wound fiber layers.

The interaction of a hollow roller 2 which follows the bending stress in a plane which passes through the axis relatively easily, thanks to the structure evident from FIG. 2 and 3, and relatively narrow support elements 10 which follow closely next to one another in the axis direction, with individual control, results in a roller which can be controlled with particular precision.

We claim:

1. A roller for applying pressure to a strip of paper, textile, plastic film, sheet metal, or other similar material, said roller comprising:

a rotatable hollow roller having an inside circumference and an outside working roller circumference, said hollow roller comprising fiber-reinforced synthetic resin material, and said hollow roller extending along a longitudinal direction;

a cross-beam extending through the hollow roller in said longitudinal direction such that there is radial spacing between the cross-beam and the inside circumference of the hollow roller around said cross-beam, said cross-beam including ends non-rotatably mounted in external supports; and a plurality of hydrostatic support elements, arranged in one or more longitudinal rows on the cross-beam, said elements being arranged on a side of said cross-beam on which pressure is exerted by the roller on the strip, said elements being pressable against the inside circumference of the hollow roller by means of hydraulic fluid, said elements each having a contact surface pressable against the inside circumference of the hollow roller, said contact surface including open bearing pockets defined by edges, said pockets being fillable with hydraulic fluid for supporting the hollow roller, said pockets adapted to enable the hydraulic fluid to flow over the edges of the pockets to form a liquid film supporting the hollow roller, and wherein the support elements have a length not exceeding 20 cm in the longitudinal direction of the hollow roller, said elements being closely arranged with respect to each other in the longitudinal direction, and said elements being controllable independently of one another.

2. The roller of claim 1, wherein the modulus of elasticity of the material of the hollow roller is less in the longitudinal direction than in a circumferential direction of said hollow roller.

3. The roller of claim 2, wherein the fiber reinforced material comprises wound filaments or aggregates of filaments and is made in three layers, wherein fibers of radially outer layers have a winding angle of ±15° relative to the circumferential direction, and fibers of a middle layer have a winding angle of ±15° relative to the longitudinal direction.

4. The roller of claim 1, wherein the hollow roller has a radial wall thickness of less than 20 mm and the modulus of elasticity of the material of the hollow roller is less than 100,000N/mm² in its longitudinal direction.

5. The roller of claim 4, wherein the hollow roller has a slip-promoting layer that is resistant to the hydraulic fluid on the inside circumference of the hollow roller.

6. The roller of claim 1, wherein the hollow roller has a coating of an elastomer material on its outside circumference.

7. The roller of claim 1, wherein each support element comprises a hydraulic piston/cylinder unit with a radial axis, each piston/cylinder unit causing a respective contact surface to be pressed against the inside circumference of the hollow roller under the pressure of a cylinder chamber, said cylinder chamber being closed except for its connection to a feed line, wherein the cylinder chambers of the individual support elements are connected to separate feed lines with pressures that can be selected independently of one another, and that the bearing pockets of the individual support elements are connected to a common feed line with the same pressure for all the support elements.

8. The roller of claim 7, further comprising a measurement device for providing a property profile of the strip, crosswise to the strip, said measurement device being connected to a control device that provides hydraulic fluid to the cylinder chambers at pressures calculated from measurement values provided by the measurement device.

9. The roller of claim 1, wherein each support element comprises an elastically resilient material with a modulus of elasticity less than $100,000 N/mm^2$, at least in a region of said element contacting the inside circumference of the hollow roller.

10. The roller of claim 9, wherein each support element has a cap made of the elastically resilient material, wherein the hydrostatic bearing pockets are formed in said cap.

* * * * *